Sept. 18, 1951   R. L. SARJEANT   2,568,415
SAMPLING AND GAUGING HEAD FOR TANKS
Filed April 9, 1948   2 Sheets-Sheet 1

INVENTOR: RALPH LIONEL SARJEANT
BY: Oswald H. Milmore
ATTORNEY

Sept. 18, 1951 R. L. SARJEANT 2,568,415
SAMPLING AND GAUGING HEAD FOR TANKS
Filed April 9, 1948 2 Sheets-Sheet 2

INVENTOR: RALPH LIONEL SARJEANT
BY: Oswald H. Milmore
ATTORNEY

Patented Sept. 18, 1951

2,568,415

UNITED STATES PATENT OFFICE 2,568,415

SAMPLING AND GAUGING HEAD FOR TANKS

Ralph Lionel Sarjeant, London, England, assignor to Shell Development Company, San Francisco, Calif., a corporation of Delaware Application April 9, 1948, Serial No. 20,141
In Great Britain April 21, 1947

3 Claims. (Cl. 73—421)

1

This invention relates to a device for facilitating the sampling and gauging of volatile liquids contained in gas-tight bulk storage tanks under low or moderate pressure without significant loss of volatile materials.

Measuring and sampling the contents of gas-tight bulk storage tanks containing volatile liquids under moderate pressure, using measuring tapes and sampling bottles lowered through an aperture in the tank, is often attended by serious loss of volatile products through the aperture, particularly when the storage tanks are of large capacity such as are found in petroleum refinery installations, and in some instances a certain degree of danger to personnel is incurred. Devices hitherto proposed with a view to preventing such losses have not been wholly satisfactory, chiefly due to their complicated nature, but also due to the fact that the measuring operation cannot be conducted with any high degree of accuracy.

Illustrative of the technique which has hitherto been adopted is a device which has found some use in petroleum installations and which consists of a standpipe, bolted about an aperture in the top of the tank, fitted with a gate valve, and a housing adapted to be bolted to the upper end of the standpipe and containing a winding reel for the measuring tape or sample bottle, dipping or ullage paste applying means, tape cleaning means, inspection windows and cleaning means therefor. Most of these ancillary components have to be controlled from the outside and must therefore be fitted into the apparatus in a vapour-tight manner which renders the whole arrangement both complicated and costly.

In operation, the housing is bolted to the standpipe, the gate valve opened, and the tape lowered into the tank by means of a handle provided on the outside of the housing. During its descent, a dipping paste is applied to the tape. On reaching the bottom of the tank the tape is rewound on to the reel, the measurement read off through the window, the tape cleaned, the gate valve shut, and the housing removed from the standpipe. Alternatively, measuring may be done by ullaging in a similar manner. Sampling is done in a somewhat analogous manner to measuring. The tedious sequence of steps thereby involved in measuring and sampling operations which are frequently needed, on occasions expeditiously, provides an incentive to operators to by-pass the procedure which alone can ensure that loss to atmosphere is avoided, but any departure from the prescribed procedure can only

2 give rise to substantial losses, say in the order of 50 gallons in the case of a bulk storage tank of 1,500,000 gallons capacity.

With the object of simplifying the tedious procedure as aforesaid, devices of a simpler character have been proposed but these achieve simplification only at the expense of some loss of volatile products during the measuring or sampling, or the operations have to be conducted in circumstances which permit of errors for example in the dip measurements.

The present invention aims at obviating the foregoing drawbacks by providing a simple and inexpensive device in which the operator can complete the measuring and sampling operations, by normal gauging and sampling methods, without significant loss of volatile products with his hands actually inside a vapour-tight space in communication with the tank contents and if desired with the same visual observance of the operations as is feasible in similar operations applied to non-volatile products.

With these objects in view according to the present invention a device to facilitate the measuring and/or sampling without major loss of volatile products contained in gas-tight bulk storage tanks under moderate pressure, through a tank aperture, comprises a connecting member for attachment about the said tank aperture, a housing which provides an enclosed working space above and around the free end of the said member and which is provided with an aperture or apertures fitted with resilient sleeves and/or resilient cuffs adapted to form a leakproof seal around an operator's wrists or arms passed therethrough, and thereby prevent leakage of volatile products from the housing to atmosphere, and a closure for the said connecting member operable by hands inserted into the housing through said aperture or apertures. In lieu of cuffs I may provide gloves fitted to the ends of the sleeves. Preferably, the device is permanently attached to the tank end thus ready for use on all occasions, the housing is provided with one or more transparent walls or windows permitting an operator to view the enclosed free end of the connecting member, and the closure for the latter is located at or near the said enclosed free end.

Furthermore it will be appreciated that when the device is in use the housing may contain vapours under some positive pressure once the operator opens the closure on the connecting member. These vapours are still present on reclosure of the connecting member, at the conclusion of the sampling or measuring operation, and would be vented to atmosphere through the apertures in the housing when the operator withdraws his arms or hands. In order to obviate the possibility of such vapours in the housing being expelled towards the face of operator, means are optionally provided in the housing in accordance with another feature of the invention, for venting the housing as and when desired independently of the aforesaid apertures.

Further features and advantages of the device according to the present invention will become apparent from the following description in conjunction with the accompanying drawings which illustrate diagrammatically and by way of example, a convenient embodiment thereof, and in which.

Figure 1:
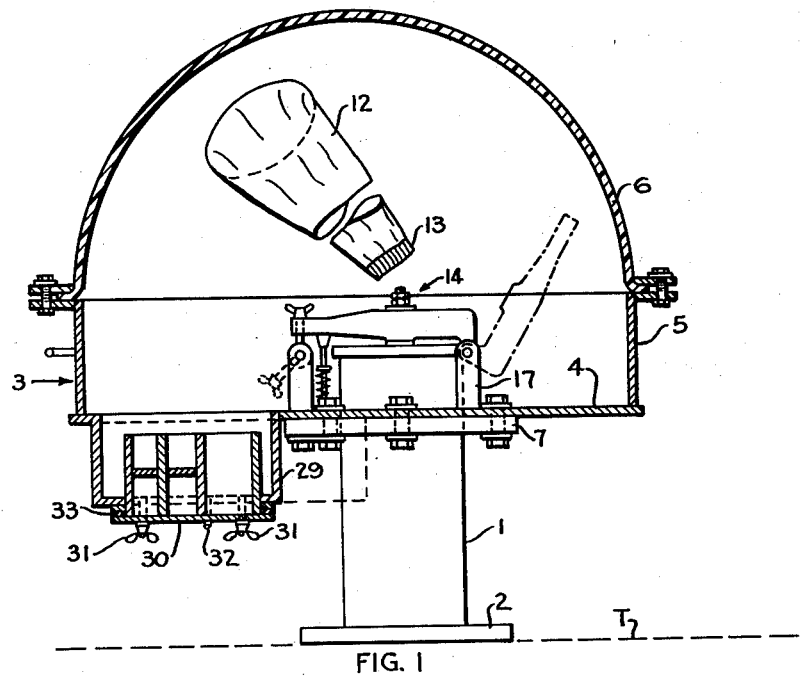
Figure 1 is an elevation, partly broken away and partly in section.

Referring to the drawings, 1 is a standpipe having a flange 2 on its lower end for attachment about an aperture in the top of a bulk storage tank T, only the top plate of which is shown. The standpipe 1 serves as a connecting member between a housing 3 and the tank. The housing 3 consists of a substantially flat metal tray 4, to the rim 5 of which is bolted in a leak-tight manner, a transparent dome 6. This dome may conveniently be constructed of a mouldable transparent artificial resin or plastic or partly of transparent and partly of opaque materials. The housing 3 is attached to the standpipe 1, in a leak-tight manner as can be seen more clearly from Fig. 3. A collar or flange 7 is welded to the standpipe and the metal tray 4 is bolted to this collar as at 8 with the interposition of suitable packing washers or gaskets 9, 10.

Two apertures 11 are provided in the dome 6, large enough and spaced apart sufficiently to permit an operator to insert his arms comfortably through the apertures into the interior of the housing. Each aperture 11 is fitted with a sleeve 12 of rubber or other suitable non-porous and resilient material extending into the interior of the housing 3. The inner or lower end of each sleeve has a resilient cuff 13 adapted to fit tightly over the operator's arm or wrist to form a leakproof seal thereby preventing leakage of volatile products in the housing to atmosphere.

Figure 2:
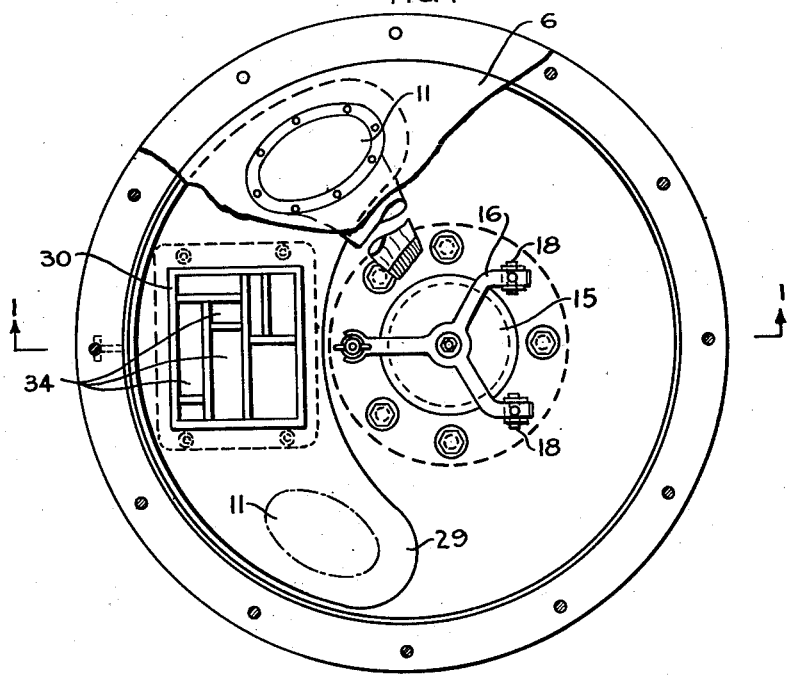
Figure 2 is a plan view partly broken away.

The end of the standpipe 1 within the housing 3 is provided with a leakproof closure 14 consisting of a cover plate 15 carried by a yoke 16 pivoted about two clevis bolts 17 on pins 18. The closure 14 is held in the closed position by a nut 19 on a swing bolt 20, pivoted on a pin 21 in a clevis bolt 22, engaging a fork 23 (Fig. 2) on the yoke 16. In order that the cover plate 15 shall seat on the end of the standpipe in a gas-tight manner, a resilient annular seating 24 is preferably embedded in the contacting face of the cover plate.

Figure 3:
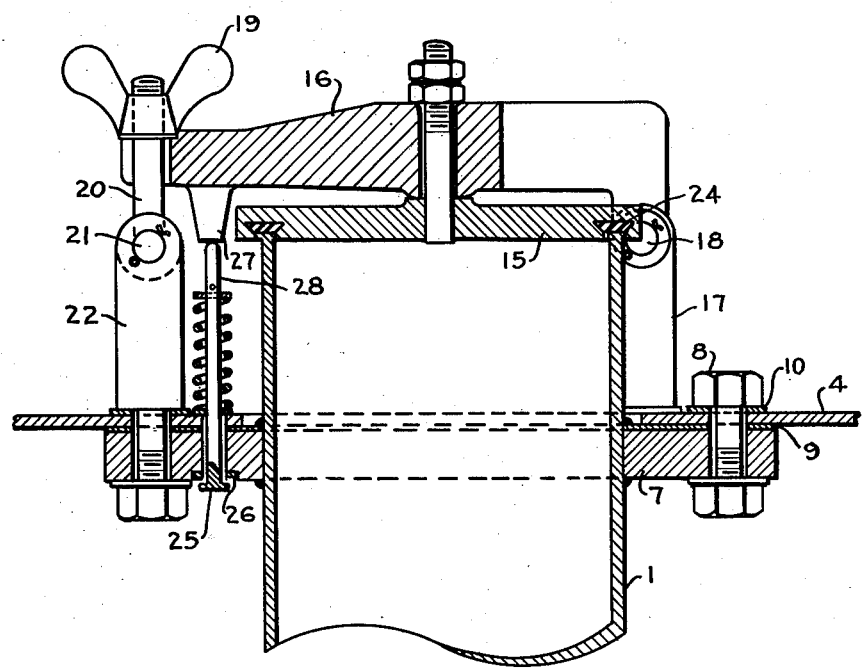
Figure 3 is a detailed section of the closure and venting means.

As hereinbefore explained, the housing may be vented independently of the apertures in the dome. A convenient way of effecting this is shown in Fig. 3 and consists of a spring loaded needle valve 25 which co-operates with a seating 26 formed in the collar 7. A lug or projection 27 on the yoke 16 contacts the upper end of the needle valve rod 28 when the yoke is secure by the nut 19, i. e., when the standpipe is closed, displacing said rod, compressing the valve spring and opening the valve. Conversely, when the standpipe closure is opened, the valve spring re-asserts itself and closes the valve.

The dimensions of the housing are chosen so that an operator standing beside the device with hands or arms inserted through the sleeves in the said apertures is readily and easily able to manipulate the closure for the connecting member, to carry out the desired measuring or sampling operations or to undertake any desired cleaning of the interior surface of the housing which may be desirable for instance on account of condensation thereon.

In order to keep the dimensions of the housing 3 within reasonable limits and also to allow the interior of the housing to be as unencumbered as possible so that the sampling and measuring operations may be conducted in an easy and efficient manner, a part of the tray 4 is formed into a kidney-shaped depression or recess 29 to accommodate the sampling and measuring instruments, such as dip tape, dipping paste, sampling bottles and cans, and the like.

To facilitate the insertion and removal of the sampling and measuring appliances into and out of the working space, part of the housing is made removable from the outside. In the embodiment shown, a rectangular tray 30 fits into an aperture in the depression 29 and is held therein by bolts 31 and dowels 32. A resilient washer or gasket 33 is interposed between the tray and the bottom of the depression to form a leak-tight seal when the tray is in position. The tray 30 is preferably divided into compartments 34 to accommodate some of the sampling and measuring instruments, whilst other appliances such as sampling cans or the like may be housed in the depression 29 itself.

Figure 4:
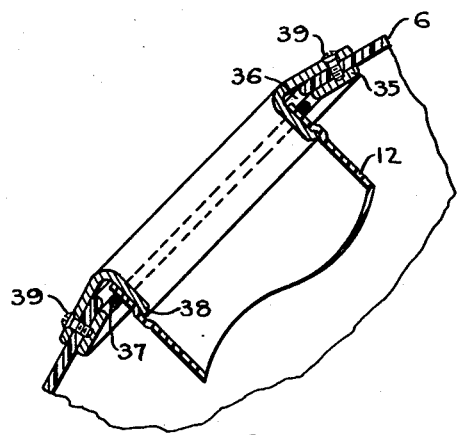
Figure 4 shows in detail the method of attachment of the sleeves to the housing.

For ease of replacement the sleeves 12 are preferably arranged to be removable from the outside of the dome 6. One method of attachment is shown in Fig. 4. The sleeve 12 is attached to a flanged ring 36 by an annular spring 37, a lip 38 being provided on the lower end of the ring 36 to insure a leak-tight seal between the parts. The flange fits over the aperture 11 and is secured to the dome by screws 39 which engage tapped holes in a metal ring 35.

The method of operation of the device is as follows:

The standpine is bolted about an aperture in a tank, preferably permanently, so that it is always ready for use. The tray 30 is removed from the housing, the measuring and sampling appliances are placed in the various compartments and the tray replaced and secured. Alternatively, in some instances, for example where it is only desired normally to use the device for measuring, the appliances may conveniently be left inside the housing after one operation ready for the next. The operator then inserts his arms into the sleeves 12, ensuring that the cuffs 13 fit tightly about his arms or wrists. The nut 19 is then slackened, the bolt 20 disengaged from the fork 23 and the closure 14 opened. In doing this the needle valve 25 is automatically closed thus rendering the interior of the housing 3 leak-proof. The operator then proceeds with the sampling and measuring in the usual way, the resilient sleeves 12 giving him ample freedom of movement within the housing to perform all the necessary operations connected with such sampling and measuring. At the conclusion of the operation, the closure 14 is closed and secured, and thereby the needle valve is opened and vents the contents of the housing to atmosphere. It will be noted in this connection that the valve is so positioned that the contents of the housing are vented downwards away from the operator. The operator then removes his arms from the sleeves and detaches the tray 30 to collect the sample bottles or the like as required.

Since the device, if permanently attached to the tank, is liable to be exposed to the elements, a waterproof cover may be provided for the housing when not in use. Alternatively, bungs or sliding covers may be provided for the apertures 11.

The device of the present invention is intended for use only with tanks under a moderate pressure, more particularly for tanks used in hot climates for the bulk storage of volatile products of the petroleum industry which are generally under a positive pressure of the order of 8 inches of water. With tanks under pressures greatly in excess of this, for instance in the neighbourhood of 1 or 2 pounds per square inch, if not actually causing discomfort to the operator may effect the accurate manipulation of the measuring and sampling appliances. The limitation is a physical one and it will be obvious to a person skilled in the art the optimum pressure conditions under which the device can be used with accuracy and relative comfort.

I claim as my invention:

1. A gauging head for tanks comprising a connecting member adapted for attachment about a tank aperture, a housing providing an enclosed working space above and around the free end of said member, said housing being provided with one or more apertures, resilient sleeves fitted to said apertures and adapted to form leak-proof seals at least when an operator's arms are passed thereinto, a closure for said connecting member operable into open or closed positions, a vent passage for said housing, a spring-loaded valve for closing and opening said vent passage, and means for operating said spring-loaded valve so as to open said valve when the closure is closed and to close said valve when said closure is open.

2. The gauging head according to claim 1 wherein the spring-loaded valve has its spring arranged for urging the valve to a closed position, the closure is hinged at the end of the connecting member, and is provided with means engaging said spring-loaded valve for operating it to its open position when the closure is swung to its closed position.

3. A sampling and gauging head for tanks comprising a connecting member adapted for attachment about a tank aperture, a housing providing a tray extending laterally from said member and an enclosed working space above and around the free end of said member, said housing being provided with one or more apertures, resilient sleeves fitted to said apertures and adapted to form leak-proof seals at least when an operator's arms are passed thereinto, a closure for said connecting member operable into open or closed positions, said tray being provided with an opening, and a removable tray fitted into said opening to provide a leak-proof closure therefor and permit sampling instruments and the like to be introduced into the working space.

RALPH LIONEL SARJEANT.

REFERENCES CITED

The following references are of record in the file of this patent:

UNITED STATES PATENTS

| Number | Name | Date |
| --- | --- | --- |
| 124,768 | Snyder | Mar. 19, 1872 |
| 1,642,577 | Carson | Sept. 13, 1927 |
| 1,819,058 | Arnold, Jr. | Aug. 18, 1931 |
| 2,166,003 | Green | July 11, 1939 |